2 Sheets--Sheet 1.
H. T. BASYE.
Potato-Plows.
No. 140,240.  Patented June 24, 1873.
Fig. 1.
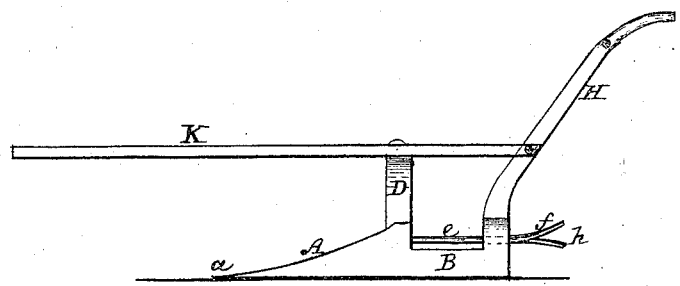
Fig. II.
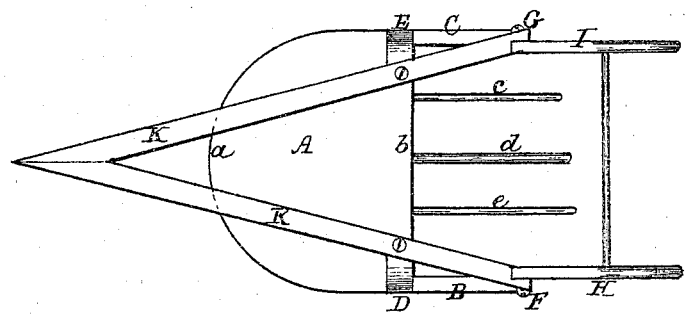
WITNESSES:  INVENTOR:
AM. PHOTO-LITHOGRAPHIC CO. N.Y. (OSBORNE'S PROCESS.)

2 Sheets--Sheet 2.

H. T. BASYE.
Potato-Plows.

No. 140,240. Patented June 24, 1873.

Witnesses:
R. S. Parks
H. P. Sanders

Inventor:
Hedgemon T. Basye,
By A. O. A. Johnson
his Attorney.

AM. PHOTO-LITHOGRAPHIC CO. N.Y. (OSBORNE'S PROCESS.)

UNITED STATES PATENT OFFICE.

HEDGEMON T. BASYE, OF DYERSBURG, TENNESSEE.

IMPROVEMENT IN POTATO-PLOWS.

Specification forming part of Letters Patent No. 140,240, dated June 24, 1873; application filed July 11, 1872.

*To all whom it may concern:*

Be it known that I, HEDGEMON T. BASYE, of Dyersburg, in the county of Dyer and State of Tennessee, have invented a new and useful Improvement in Potato-Plows, of which the following is a specification:

My improvement relates to plowing potatoes, and separating them from the plowed earth as the plow is drawn through the soil; and my improvement consists of a V-shaped draft-frame in combination with the handles, side runners, the shovel, and the pivoted fingered cross-head, whereby the frame and the parts of the plow connected therewith are all braced and rendered strong and durable, and the management of the plow more easy and convenient.

Figure 3:
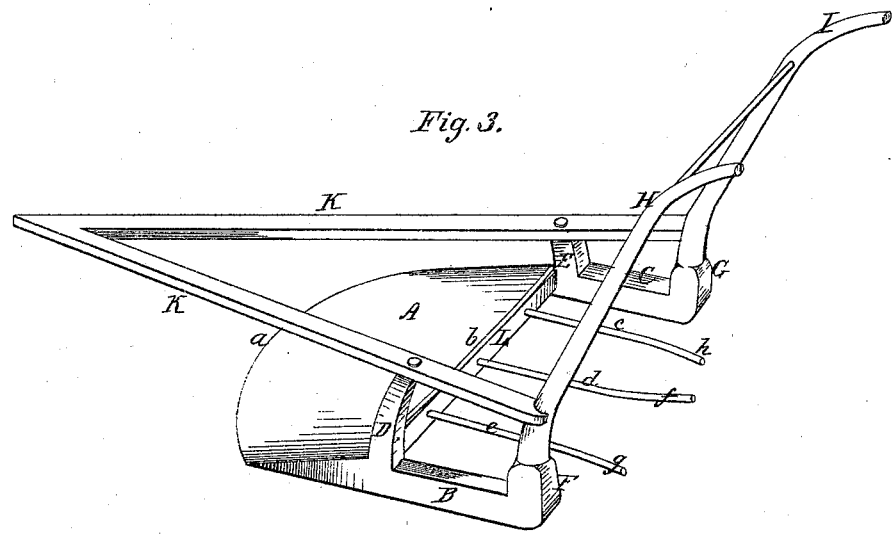
Figure 4:
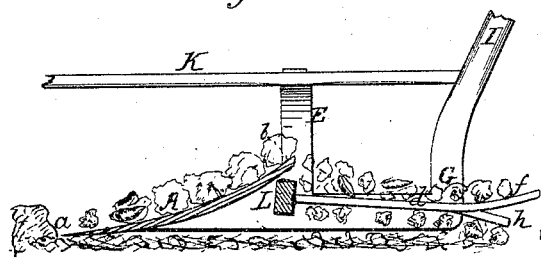
Figure 5:
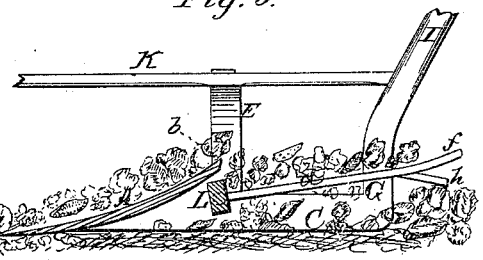

In the accompanying drawing, Figure 1 represents a side view; Fig. 2, a top view; Fig. 3, a view in perspective; and Figs. 4 and 5, sectional views of a potato-plow embracing my invention, the two latter views showing the fingers in different positions as they pass over uneven soil.

The frame consists of two side runners, B C, made in one piece with a shovel-plow, A, the front cutting-edge $a$ of which is rounded and rises therefrom with a gentle concave curve to the rear straight-edge $b$, from which point short standards D E on the runners support the draft-frame K, which also connects with the handles H I, also secured to short standards F G on the rear ends of the runners and braced together. The rear edge $b$ of the plow is raised sufficiently upon the runners to give room for a fingered cross-head, L, beneath it, and allow the fingers $c\ d\ e$ to extend out from beneath the plow A, and be independent of it. This cross-head L is secured upon pivot-ends in bearings in the runners B C, so as to be free to rock with the fingers $c\ d\ e$, as the latter drag as a rake upon the uneven plowed soil, and thus cause them to jolt up and down with the soil and potatoes on them, and by such automatic shaking aid in separating the earth from the potatoes, combining in this manner a soil and potato-plow with automatic sifting and separating fingers extending back from beneath the plow, and having the rear end $f$ of the middle finger $d$ curved upward to cut the soil, and the ends $g\ h$ of the outside fingers $c\ e$ curved downward to serve to give to the fingers their jolting over and upon the clods of earth and stones, as the plow is drawn forward under the potatoes. As the potatoes and soil pass together over the raised edge $b$ of the plow, they fall enough to break the soil over said sharp strait edge $b$, when the fingers, by their automatic jolting movement, complete the breaking and separation of the soil and potatoes, and leave the latter in rows in which the curved ends $f\ g\ h$ of the fingers aid, and also in giving the latter the movement described.

I claim—

The V-shaped draft-frame K, in combination with the side runners C B, handles H I, shovel A, and pivoted fingered cross-head L, all as shown and set forth.

HEDGEMON T. BASYE.

Witnesses:
RICHARD GERNER,
FRANKLIN DARRITT.